June 26, 1934.  I. R. SHUE  1,964,540
METHOD OF MAKING A GRINDING DISK
Filed Oct. 26, 1931  3 Sheets-Sheet 1
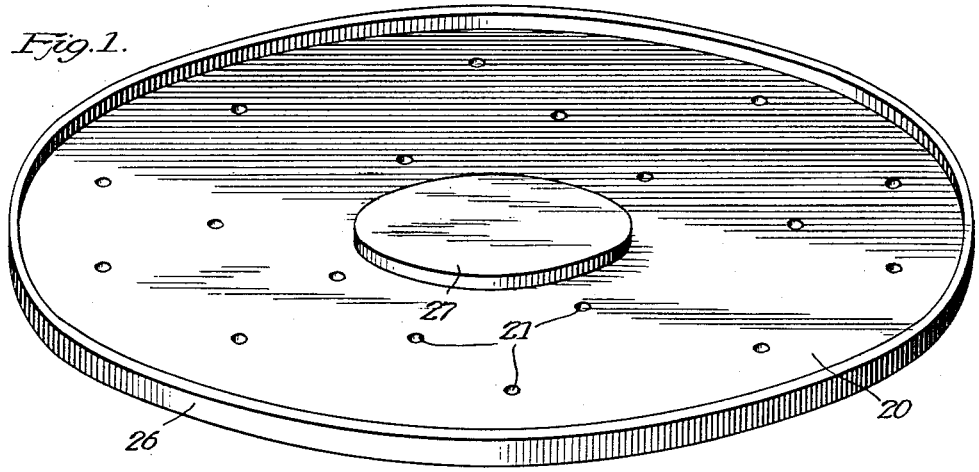
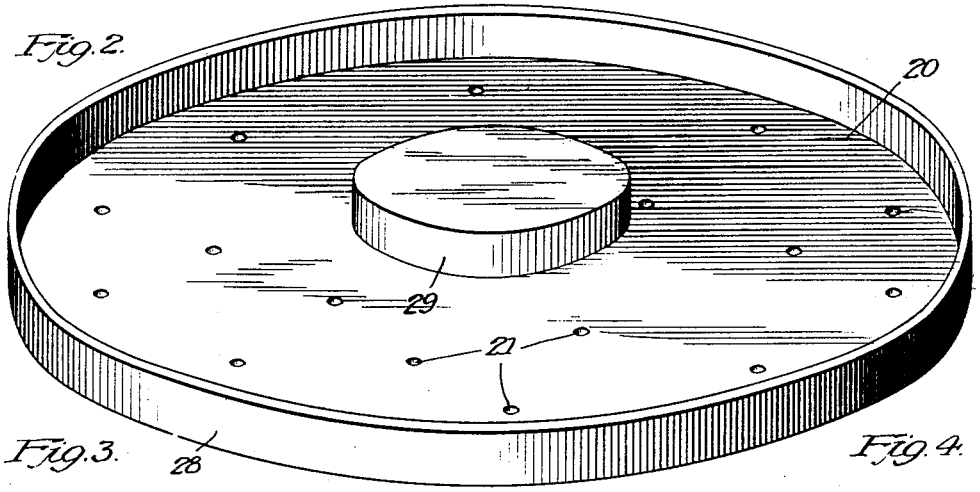
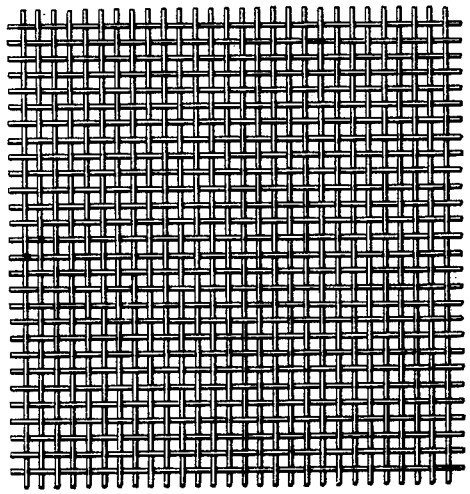
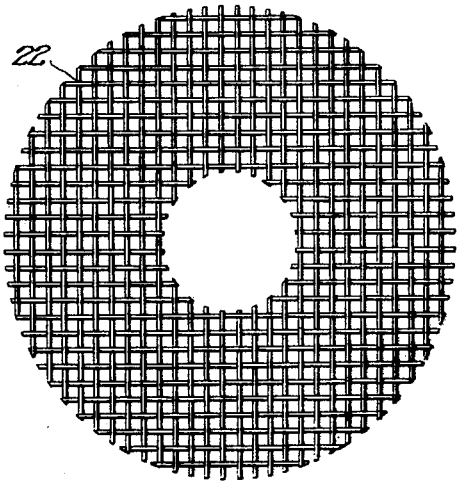
Inventor
Ingle R. Shue
By Chindell Parker Carlson
Attys.

June 26, 1934.  I. R. SHUE  1,964,540
METHOD OF MAKING A GRINDING DISK
Filed Oct. 26, 1931   3 Sheets-Sheet 2
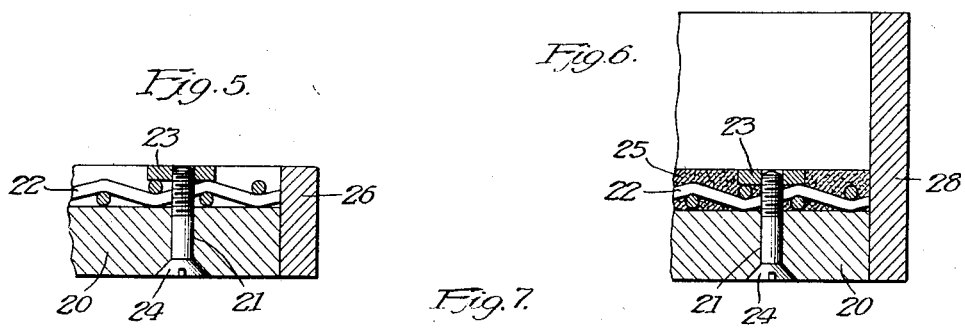
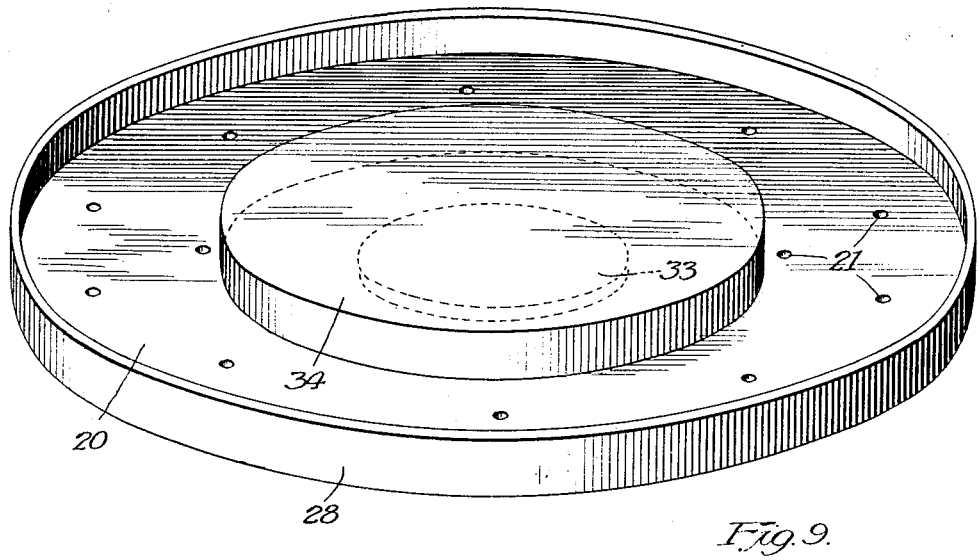
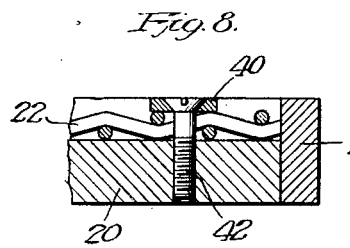
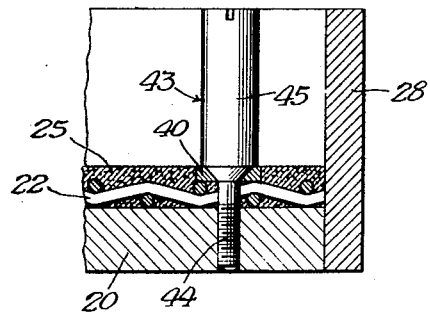
Inventor
Ingle R. Shue
By Chindahl Parker Carlson
Attys.

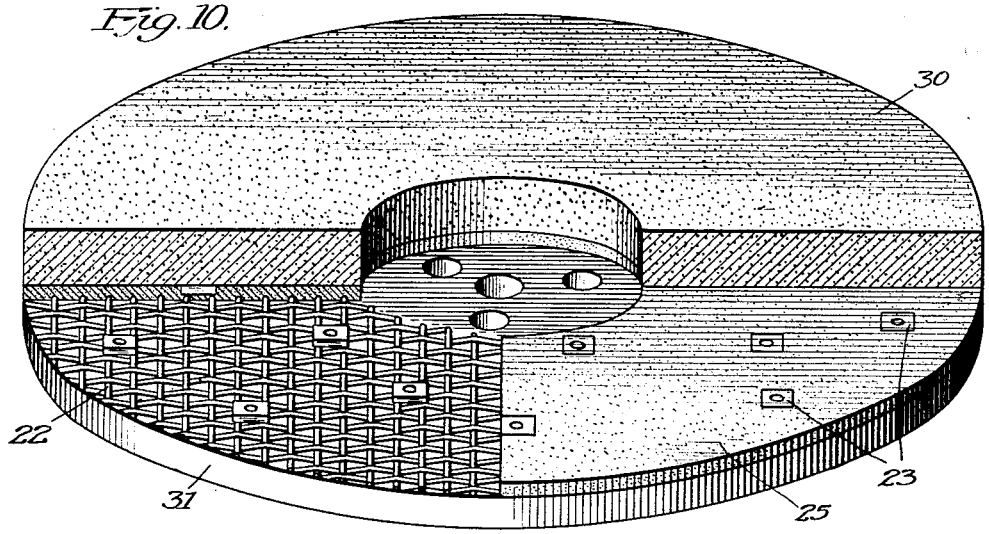
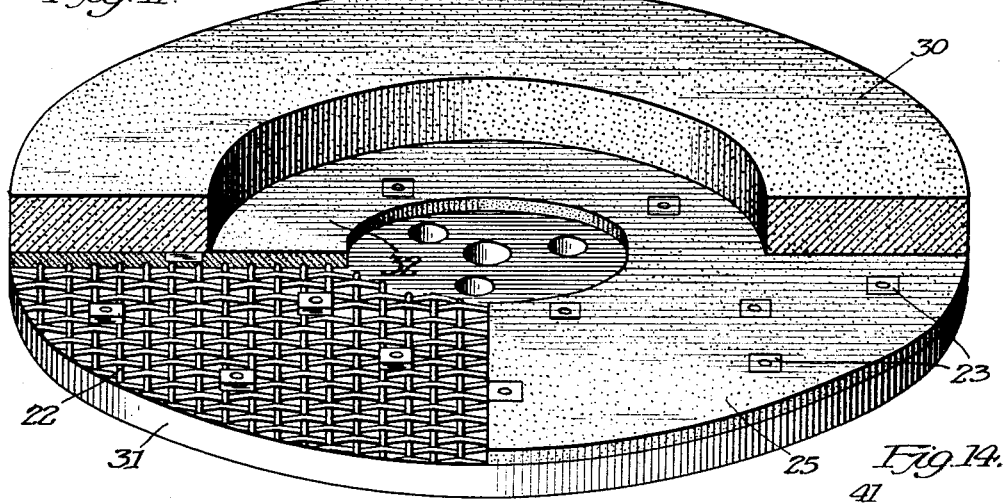
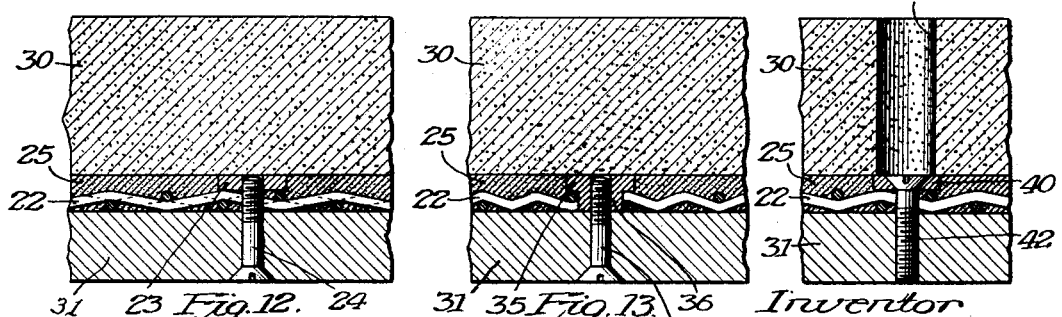

Patented June 26, 1934

1,964,540

UNITED STATES PATENT OFFICE 1,964,540

METHOD OF MAKING A GRINDING DISK

Ingle R. Shue, Beloit, Wis., assignor to Gardner Machine Company, Beloit, Wis., a corporation of Illinois Application October 26, 1931, Serial No. 571,161

8 Claims. (Cl. 18—59)

The present application is a continuation in part of applicant's copending application, Serial No. 539,859, filed May 25, 1931.

The invention relates generally to a new method of making grinding wheels, and more particularly to a method of making wheels of the disk type.

The general object of the invention is to provide a novel method of making a grinding disk which may be readily attached to a supporting wheel, which is strong and not subject to cracking, and which permits of a maximum use of the abrading material.

Another object is to provide a novel method of making a grinding disk having a strengthening means molded therein which is adapted to distribute the stress on the disk over the entire flat area thereof, said strengthening means being so positioned in the abrading material that the major part of the latter is available for use.

A further object is to provide a novel method of making a grinding disk comprising two layers of molded material, one being an abrading material of any desired grade of hardness, while the other is a material of great strength intimately connected to the layer of abrading material.

Still another object is to provide a novel method of making a disk of the two layer type, in the rear or strengthening layer of which are embedded reinforcing and securing means for attaching the disk to a supporting wheel.

A still further object is to provide a novel method of making a narrow-faced annular form of disk comprising two layers of the above-mentioned character, wherein the rear or strengthening layer not only underlies the layer of abrading material but also extends inwardly beyond said abrading layer with reinforcing and securing means embedded in said inwardly extending portion.

Another object is to provide a novel method of making a grinding disk which may be readily attached to a supporting wheel in a grinding machine where only the front or top face of said wheel is readily accessible.

Other objects and advantages will become apparent from the following description taken in connection with the accompanying drawings, in which:

Figure 1 shows a molding plate when arranged for one of the initial steps in the method of molding a grinding disk.

Fig. 2 shows the molding plate when arranged for a later step in the method.

Fig. 3 is a view of a piece of wire mesh from which is cut the piece constituting the reinforcing means as shown in Fig. 4.

Figs. 5 and 6 show fragmentary sectional views of the molding plate with one form of securing means and illustrating the arrangements for forming the respective layers.

Fig. 7 is a view similar to Fig. 2 but showing the molding plate when arranged for one of the later steps in molding a different form of disk from that for which the plate in Fig. 2 is arranged.

Figs. 8 and 9 are views similar to Figs. 5 and 6 but showing the molding plate arranged with a different form of securing means.

Figs. 10 and 11 are perspective views, partially broken away, of two forms of disks.

Figs. 12, 13 and 14 are fragmentary sectional views of disks showing different forms of securing means.

While the invention in its broadest aspects is not limited to the specific details of any particular disk, it is herein described in connection with the disks illustrated in Figs. 10 to 14. The method comprises generally molding a grinding disk preferably with reinforcing and securing means embedded therein.

In carrying out the method, a special molding plate 20 is provided which is equal in diameter to the grinding disk to be molded. A plurality of holes 21 are drilled through the molding plate in spaced relation to each other, said holes being in a predetermined arrangement corresponding to the arrangement of securing means in the grinding disk.

To reinforce the disk, means preferably comprising a wire mesh 22 (see Fig. 4) is provided, which means is spread over the molding plate and is secured thereto by devices comprising embedded members and removable members, the latter extending through interstices of the mesh to be secured in the molding plate. Thus, certain interstices of the wire mesh are alined with the holes 21 in the molding plate to permit the insertion of the removable members of the securing devices.

The prime consideration in spacing the securing devices over the area of the disk is to position them at points where the greatest stresses in the disk occur. Hence, the holes 21 in the molding plate are correspondingly spaced. However, this spacing is varied to some extent so that the holes may directly aline with certain interstices of the wire mesh to avoid as much as possible any necessity of shifting the wires of the mesh sidewise to permit the insertion of the removable members.

The wire mesh may also be cut from a piece, such as is shown in Fig. 3, to its circular form, as shown in Fig. 4, so that the best alinement of the interstices and holes may be had. In placing the wire mesh on the molding plate, the mesh may be rotated to bring the interstices and holes in alinement, as contemplated. If complete alinement of all the holes with the corresponding interstices cannot then be had, the wires forming the interstices may be flexed.

When the wire mesh is so positioned, the embedded members of the securing devices are spread over the mesh in alinement with the holes 21 and the corresponding interstices, and the removable members of the securing devices are inserted therethrough, rigidly clamping the wire mesh against the molding plate. Each embedded member preferably is a nut, of non-circular form to prevent rotation, such as a square nut 23 (see Figs. 5, 6 and 10 to 12) and the corresponding removable member is preferably a screw 24 extending through the molding plate with its head countersunk in the rear face thereof.

The molding plate with the wire mesh and securing devices attached thereto is made ready for the step of molding the material, which the disk comprises, by the addition of a rim and center plug, the latter to form an opening through the center of the disk. When a disk of two layers is to be made, the rim and plug project above the surface of the molding plate a distance equal to the thickness of the first or rear layer 25 in which the reinforcing means and securing devices are embedded. Such a rim and plug are shown respectively at 26 and 27 in Fig. 1, and a section thereof in Fig. 5. Since the reinforcing and securing means make the portion of the disk occupied thereby unavailable for grinding, the first or rear layer is preferably made of a thickness equal to the thickness of the embedded members of the securing devices and the wire mesh, and the rim 26 correspondingly projects above the molding plate by that amount, as shown in Fig. 5.

With the rim 26 and plug 27 in place, the material of which the first layer is made is spread on the molding plate. This material is preferably of great strength, when in its complete state, in order to give strength to the disk regardless of the strength of the portion which is available for grinding, since the portion available for grinding may be made quite soft for certain classes of work. The material is tamped to force it into the interstices of the mesh, so that the latter is thoroughly embedded, and is leveled off flush with the tops of the rim 26 and plug 27 and the face of the nuts 23, and is pressed.

The material may be allowed to dry for a while or the process may proceed without drying. The rim 26 and plug 27 are then removed and a higher rim 28 and plug 29 are substituted, the latter two projecting above the molding plate a distance equal to the thickness of the finished disk. The abrading material comprising the usable portion of the disk or front layer 30 is then molded over the rear layer, and is tamped, levelled off, pressed and cured.

To remove the completed disk from the molding plate, the screws 21 are removed, and the disk is ready to be placed on a grinding machine. To this end, it is attached to the face of a supporting wheel 31, by the screws 21, or similar ones, which extend through holes in the supporting wheel, with their heads countersunk in the rear face thereof, in a similar manner to their attachment to the molding plate, the holes in the supporting wheel being correspondingly spaced to those in the molding plate to aline with the embedded members of the securing devices.

If it is desired to make the disk with only one layer, the rim 28 and center plug 29, shown in Fig. 2, are used without first using the low rim 26 and plug 27.

The method may also be adapted to making a narrow faced annular form of disk, as illustrated in Fig. 11, which comprises two layers wherein the rear or strengthening layer not only underlies the layer of abrading material but also extends inwardly beyond said abrading layer with reinforcing and securing means embedded in said inwardly extending portion. The first or rear layer is formed on the molding plate with the rim 26 and center plug 27 as shown in Fig. 1, the plug 27 forming the hole through the rear layer of the finished disk.

The second or front layer has a larger internal diameter than that of the rear layer so that the rear layer extends inwardly beyond the front or abrading layer (see Fig. 11), the inwardly extending portion being indicated at 32. To mold the front layer, the higher rim 28 is used, and a center plug comprising a lower portion 33, (see Fig. 7), equal in diameter to the inner diameter of the rear layer and an upper portion 34 equal in diameter to the inner diameter of the front layer, is substituted for the first plug 27. The steps in molding the front layer then follow those heretofore described.

In place of using the square nuts 23 shown in Fig. 12, a nut comprising an enlarged upper portion 35, (see Fig. 13), which rests on the wire forming an interstice, and a shank 36 may be used. The shank 36 is inserted into an interstice of the wire mesh and the hole therethrough is alined with the hole in molding plate, the nut being secured thereto by a screw 24, as in the case of the plain square nut 23.

In some instances, the rear face of the supporting wheel 31 on which the grinding disk is mounted is inaccessible. The disk to be mounted on such a supporting wheel is constructed so that the removable members of the securing devices may be inserted from the front face of the disk. Such a disk is illustrated in Fig. 14, the embedded member of each securing device comprising preferably a washer 40 resting on the wires forming an interstice. A hole 41 is formed above the washer 40 extending from the front face of the washer through the abrading portion of the disk to the front face thereof, the hole being preferably of smaller diameter than the washer so that the washer is thoroughly embedded in the abrading material. The removable member of each securing device comprises a screw 42 inserted through the hole 41 and threaded into the supporting wheel 31 with its head countersunk in the washer 40.

In molding this form of disk, the washers 40 are placed on the wire mesh in their proper locations and are clamped against the mesh by screws threaded into the molding plate such as the screws 42 (see Fig. 8). The first layer is then molded on the mesh and around the screws and washers, the screws constituting a first set of pins forming holes through the first layer. After the first layer is formed, the screws are removed, and a second set of pins 43 (see Fig. 9) are substituted therefor together with the higher rim 28. Each pin 43 extends above the face of the mold plate a distance equal to the thickness of the completed disk and comprises a lower portion 44, which is the same shape as the screw 42 and is threaded into the mold plate, and an upper portion 45, which forms the hole 41 in the disk. The abrading material is then molded onto the first layer and around the upper portion 45 of the pin, and the succeeding steps in completing the disk are as heretofore described. If a disk having securing means of this type is to be made in only one layer, the use of the screws 42 and the short rim 26 is eliminated, and the entire disk is molded with the higher rim 28 and the pins 43 attached to the mold plate.

From the above description, it will be evident that any of the forms of securing means may be used in either a single or double layer disk.

I claim as my invention:—

1. The method of making grinding disks which comprises providing a molding plate with a plurality of holes therethrough in a predetermined arrangement, cutting a wire mesh to fit on said molding plate, placing said wire mesh on said molding plate with certain interstices approximately alined with said holes, flexing the wires forming said interstices to accurately aline said interstices with said holes, positioning a plurality of securing members on said mesh and over said interstices, securing said members in place by fastening devices engaging in said holes, and molding a disk of abrading material onto the mesh and about the securing members.

2. The method of making grinding disks which comprises spreading a wire mesh on a molding plate, placing a plurality of nuts on said wire mesh, springing the wires of said mesh sidewise to permit screws to be inserted therethrough and into said nuts, securing said nuts and clamping said mesh against said molding plate by said screws passing through said molding plate, and molding a disk of abrading material onto the mesh and about the nuts.

3. The method of making grinding disks which comprises providing a molding plate with a plurality of holes therethrough in a predetermined arrangement, spreading a wire mesh on said molding plate, placing a plurality of nuts having a reduced portion fitting in the interstices of said mesh, springing said mesh sidewise to aline the holes in said nuts with the holes in said molding plate, securing said nuts in place by screws passing through said molding plate, and molding a disk of abrading material onto the mesh and about the securing members.

4. The method of making grinding disks which comprises spreading a foraminous reinforcing means on a molding plate, placing a plurality of securing members on said reinforcing means in a predetermined arrangement, maintaining said securing means in such arrangement, spreading a layer of relatively strong molded material over said mesh and around said securing members, leveling said molded material to lie flush with the upper faces of said securing members, and molding a disk of abrading material onto said molded material.

5. The method of making grinding disks which comprises placing a plurality of securing members on a molding plate in a predetermined arrangement, maintaining said members in such arrangement, spreading a layer of relatively strong molded material on said molding plate and around said securing members with its upper surface flush with the upper face of said securing members, and molding a disk of abrading material over said layer of molded material.

6. The method of making grinding disks which comprises placing a wire mesh on a molding plate, placing a plurality of securing members on said mesh in predetermined arrangement, maintaining the members in such arrangement, spreading a layer of relatively strong molded material over said wire mesh and around said securing members, tamping said molded material to force it into interstices of said mesh, leveling off said molding material so that it lies flush to the upper face of said securing members, and molding a disk of abrading material onto said layer of molded material.

7. The method of making grinding disks which comprises spreading a wire mesh on a molding plate, placing a plurality of washers on said wire mesh in a predetermined arrangement, securing said washers in such arrangement by pins extending therethrough and into the molding plate, spreading a layer of relatively strong molded material onto the wire mesh and around said washers, leveling off said layer so that its upper face lies flush with the upper face of said washers, pressing said layer, removing said pins, inserting a second set of pins which extend above said washers to a height approximately equal to the thickness of said disk, and molding a layer of abrading material on said first layer and around said second set of pins.

8. The method of making grinding disks which comprises placing a wire mesh of circular form on a molding plate having a center plug of predetermined thickness, placing a plurality of securing members on said wire mesh in a predetermined arrangement, maintaining said securing members in such arrangement, spreading a layer of relatively strong molded material onto said mesh and around said securing members to a depth equal to the thickness of said center plug, placing a second center plug, on said molding plate, of a greater diameter than said first center plug so that it will overlie a portion of said first layer, and molding a disk of abrading material onto said first layer and around said second center plug.

INGLE R. SHUE.